(12) United States Patent
Chaniot et al.

(10) Patent No.: US 8,412,388 B2
(45) Date of Patent: Apr. 2, 2013

(54) ASSISTED PILOTING METHOD AND DEVICE FOR AN AIRCRAFT FOR USE IN THE EVENT OF A FIRST LIMIT INDICATOR BREAKING DOWN

(75) Inventors: Daniel Chaniot, Marignane (FR);
Olivier Voinchet, Sausset (FR);
Francois-Xavier Gaulmin, Salon de Provence (FR)

(73) Assignee: Eurocopter, Marignane Cedex (FR)

( * ) Notice: Subject to any disclaimer, the term of this patent is extended or adjusted under 35 U.S.C. 154(b) by 316 days.

(21) Appl. No.: 12/883,738

(22) Filed: Sep. 16, 2010

(65) Prior Publication Data

US 2011/0071708 A1    Mar. 24, 2011

(30) Foreign Application Priority Data

Sep. 23, 2009    (FR) ..................... 09 04541

(51) Int. Cl.
*G01C 23/00* (2006.01)
(52) U.S. Cl. .................. 701/3; 701/9; 340/973
(58) Field of Classification Search .................. 701/3, 9, 701/14; 340/971, 973
See application file for complete search history.

(56) References Cited

U.S. PATENT DOCUMENTS

| | | | | |
|---|---|---|---|---|
| 4,794,755 A * | 1/1989 | Hutto et al. ............... | 60/39.281 |
| 5,277,024 A * | 1/1994 | Bissey et al. ............... | 60/39.281 |
| 5,440,490 A * | 8/1995 | Summerfield ................ | 701/100 |
| 5,915,273 A * | 6/1999 | Germanetti ................ | 73/178 H |
| 5,986,580 A * | 11/1999 | Permanne ..................... | 340/946 |
| 6,150,959 A | 11/2000 | Germanetti | |
| 6,745,572 B2 * | 6/2004 | Jay et al. .......................... | 60/773 |
| 7,043,896 B2 * | 5/2006 | Matthews .................. | 60/39.091 |
| 7,143,003 B2 * | 11/2006 | Certain ......................... | 702/144 |
| 7,161,501 B1 * | 1/2007 | Lynch et al. .................. | 340/971 |
| 7,212,942 B2 * | 5/2007 | Vollum ........................ | 702/127 |
| 7,322,178 B2 * | 1/2008 | Simoni ..................... | 60/39.281 |
| 7,414,544 B2 * | 8/2008 | Oltheten et al. ............ | 340/946 |
| 7,668,639 B2 * | 2/2010 | Francois ......................... | 701/99 |
| 2008/0275597 A1 | 11/2008 | Gaulmin et al. | |

FOREIGN PATENT DOCUMENTS

EP    0816226 A1    1/1998
FR    2749545 A1    12/1997

OTHER PUBLICATIONS

International Search Report and Written Opinion; International Application No. FR 0904541; dated Apr. 29, 2010.

* cited by examiner

*Primary Examiner* — Helal A Algahaim
(74) *Attorney, Agent, or Firm* — Brooks Kushman P.C.

(57) ABSTRACT

An assisted piloting method for an aircraft having at least two engines (2, 3) includes monitoring a set of parameters (Ng, T4, Tq) of the engines. A first limit indicator (10) displays information relating to a value of a limiting parameter of the engines. The limiting parameter is the parameter (Ng, T4, Tq) of the engines that is the closest to its limit. An assisted piloting mode is activated during which each parameter (Ng, T4, Tq) is maintained below a predetermined threshold whenever the first limit indicator is not in a position to display the information.

17 Claims, 1 Drawing Sheet

ASSISTED PILOTING METHOD AND DEVICE FOR AN AIRCRAFT FOR USE IN THE EVENT OF A FIRST LIMIT INDICATOR BREAKING DOWN

CROSS REFERENCE TO RELATED APPLICATION

This application claims the benefit of French Application Serial No. 09 04541 dated Sep. 23, 2009, the disclosure of which is incorporated herein by reference.

FIELD OF THE INVENTION

The present invention relates to an assisted piloting method and device for a rotorcraft having at least two engines, and for use in the event of a first limit indicator breaking down.

BACKGROUND OF THE INVENTION

More particularly, a helicopter is piloted while monitoring numerous instruments on a control panel, which instruments for the most part represent the operation of the power plant and of the aircraft. For physical reasons, there are numerous limits that the pilot needs to take into account at each instant while flying. These various limits generally depend on the stage of flight and on external conditions.

Most presently-manufactured helicopters are fitted with a power plant that possesses one or two free-turbine turbine engines. Power is then taken from a low-pressure stage of the free turbine, which stage is mechanically independent of the assembly comprising the compressor and the high-pressure stage of the turbine engine. The free turbine of a turbine engine rotates at a speed lying in the range 20,000 revolutions per minute (rpm) to 50,000 rpm, so a speed-reducing gearbox is needed for the connection to the main rotor since its speed of rotation generally lies in the range 200 rpm to 400 rpm: this gearbox is the main power-transmission gearbox (MGB).

Thermal limits on the turbine engine and torque limits on the main gearbox serve to define three normal utilization ratings for the turbine engine:
  a take-off power rating usable for five to ten minutes and corresponding to a level of torque for the main gearbox and a level of heating for the turbine engine that can be accepted for a limited length of time without significant degradation: this is referred to as the take-off power (TOP) rating;
  a maximum continuous power rating during which the capabilities of the main gearbox and the capabilities that depend on maximum acceptable continuous heating upstream from the high pressure blades of the first stage of the turbine are never exceeded: this is referred to as maximum continuous power (MCP) rating; and
  a maximum transient power rating that might optionally be limited by regulations: this is referred to as the maximum transient power (MTP) rating.

There also exist emergency excess supercontingency ratings on multi-engine aircraft that are used in the event of a turbine engine breaking down:
  the first emergency rating during which the capabilities of the inlet stages of the main gearbox and the temperature potential of the turbine engine are used to the maximum: this is referred to as a super emergency power (PSU), and it can be used for up to thirty consecutive seconds, at the most, and it can be used three times in one flight. If the super emergency power (PSU) has been used, then the turbine engine must be removed and overhauled;
  the second emergency rating during which the capabilities of the inlet stages of the main gearbox and the potential of the turbine engine are used very largely: this is referred to as a maximal emergency power (PMU) and can be used for a maximum of two minutes after the super emergency power (PSU) or of two minutes and thirty seconds consecutively, at the most; and
  the third emergency rating during which the capabilities of the inlet stages of the main gearbox and the thermal potential of the turbine engine are used without damaging them: this is referred to as an intermediate emergency power and it can be used for thirty minutes or continuously for the remainder of the flight after the turbine engine has broken down.

The above-mentioned limits are generally monitored by means of three parameters: the speed of the gas generator, engine torque, and the temperature at which gas is ejected into the inlet of the free turbine, these parameters being respectively written Ng, Cm, and T4 by the person skilled in the art.

For each rating, the manufacturer defines thresholds beneath which the monitoring parameters must be maintained.

The pilot must then monitor these monitoring parameters in order to ensure that the defined threshold for the rating in use is not exceeded. Such monitoring becomes particularly difficult for a helicopter having at least two engines insofar as it is appropriate to use three distinct dials for each engine.

Furthermore, the most recent turbine engines are controlled and regulated by a control and regulator member that is fitted with a regulator electronic computer, referred to as a FADEC by the person skilled in the art, and that serves in particular to determine the position of the fuel metering device as a function firstly of a regulation loop including a primary loop based on maintaining the speed of rotation of the lift rotor of the rotorcraft and secondly of a secondary loop based on a setpoint value of the piloting parameter.

A FADEC regulator member also receives signals relating firstly to monitoring parameters of the turbine engine under its control, and secondly to monitoring parameters of important members of the rotorcraft such as the speed of rotation of the lift rotor, for example.

The FADEC regulator member then transits the values of the monitoring parameters to a first limit indicator that is arranged in the rotorcraft cockpit.

Document FR 2 749 545 in particular describes a first limit indicator that identifies from amongst the monitoring parameters of the turbine engines, which is the particular parameter that is closest to its limit. The information relating to the limits to be complied with is thus grouped together on a single display making it possible firstly to summarize the information and present solely the result of that summary so as to simplify the pilot's task, and secondly to save space on the control panel. This produces a "limiting parameter" selected from amongst the monitoring parameters of the turbine engine, i.e. the parameter having a current value that is the closest to its limit value. That is why such an indicator is sometimes referred to as a "first limit instrument" (FLI).

This first limit indicator thus enables the present value of the limiting parameter to be known at any instant. This reduces the pilot's workload considerably since the pilot need use only one measuring instrument and no longer needs to use six instruments for a twin-engine helicopter.

This first limit indicator is sometimes displayed on a first screen of a first equipment in a central display system, the first equipment being referred to as a vehicle engine multifunction display (VEMD).

Furthermore, this first equipment is capable of displaying on a second screen the temperature and the pressure of oil in the turbine engine(s), the temperature and the pressure of oil in a main gearbox, the voltage and the current delivered by an electricity generator, and the outside temperature.

In the event of the first equipment breaking down, e.g. its screen breaking down, the pilot no longer has a first limit indicator for avoiding exceeding the limits set by the manufacturer.

The pilot must then rely on auxiliary instruments in order to obtain the values of the monitoring parameters. More precisely, on a helicopter having two turbine engines, the pilot needs to monitor six conventional indicators in order to monitor the speed of the gas generator, the engine torque, and the temperature at which gas is ejected into the inlet of the free turbine, for each turbine engine. In parallel, the pilot needs to consult the flight manual in order to determine what threshold should not be exceeded for each of the monitoring parameters.

This increases the workload on the pilot at a time when flying conditions are degraded. The pilot is then requested to interrupt the current mission and to make a precautionary landing without a period of hovering flight. The landing procedure may be difficult if the helicopter is to land on a confined zone, e.g. on board a ship.

Consequently, in order to preserve the engines of a helicopter having at least two turbine engines in the event of a first limit indicator breaking down, the known architecture requires the pilot to cancel the current mission, and increases the pilot's workload by requiring the pilot to use conventional instruments in order to avoid exceeding the thresholds set by the manufacturer.

SUMMARY OF THE INVENTION

An object of the present invention is thus to reduce the workload on the pilot of a helicopter having at least two engines, while also avoiding the need to cancel the current mission in the event of the first limit indicator breaking down.

According to the invention, a method of assisting piloting in the event of a breakdown of a first limit indicator of an aircraft having at least two engines and a plurality of monitoring parameters relating to the engines of said aircraft, said first limit indicator displaying information relating to a value for a limiting parameter of said engines, the limiting parameter being that one of the engine monitoring parameters that is the closest to its limit, is remarkable in that an assisted piloting mode is activated, during which each monitoring parameter is kept below a predetermined threshold, whenever said first limit indicator is no longer in a position to display said information.

Consequently, the pilot's authority over the engines of the aircraft is reduced, while simultaneously reducing the pilot's workload.

Instead of consulting a flight manual and a multitude of conventional dials in order to ensure that none of the limits set by the manufacturer is exceeded, the pilot may on the contrary perform other tasks, for example looking for somewhere suitable to land.

The state of the art considers that there is no point in assisting the pilot of an aircraft having a plurality of engines in managing the imposed limits since those limits are sufficiently high. More particularly, on a twin-engine helicopter with properly functioning engines, it is considered that there is no need to put a physical ceiling on engine performance in order to preserve the engines.

Going against those prejudices, in the event of the first limit indicator malfunctioning, the invention seeks to maintain the monitoring parameters of the engines below predetermined thresholds, and below the limits set by the manufacturer for each of the parameters, so as to lighten the pilot's workload. The pilots of modern twin-engine helicopters are no longer accustomed to piloting on conventional instruments, so they may well find themselves in situations that are difficult and disturbing when their main instrument, i.e. the first limit indicator, is no longer operating.

Furthermore, in this degraded flying mode, the prior art requires the mission to be interrupted. By implementing the invention, it is no longer necessary to interrupt the mission since the engines are physically prevented from operating beyond the imposed limits, and this is done without increasing the pilot's workload.

The method of the invention may also include one or more of the following additional characteristics.

For example, the engines are turbine engines, each having a free turbine and a gas generator, and the monitoring parameters comprise the speed of the gas generator of each engine, the engine torque of each engine, and the gas ejection temperature at the inlet to the free turbine of each engine.

As a result, the pilot no longer needs to monitor six conventional instruments, since under all circumstances the control member will prevent the imposed limits being exceeded, by maintaining the surveillance parameters below their associated thresholds.

Furthermore, the engines are capable of operating at a plurality of ratings, and the threshold is modified as a function of the current rating.

When flying below a given forward speed, a twin-engine helicopter operates at a take-off rating, above said forward speed, and it operates at a maximum continuous rating.

Under such circumstances, a control member that receives data relating to said forward speed via the usual equipment, can make use of "take-off" thresholds while a take-off rating applies and can make use of "maximum continuous" thresholds when a maximum continuous rating is being applied.

Advantageously, each monitoring parameter is maintained below a predetermined threshold by putting ceilings on the monitoring parameters. Thus, by putting a ceiling on the values of the monitoring parameters, the engines are capped so that they do not exceed the limits imposed by the manufacturer.

For example, each monitoring parameter is maintained below a predetermined threshold by putting a ceiling on the rate at which fuel is fed to the engines. This guarantees to the pilot that the engine will not exceed its imposed limits when the assisted piloting mode is activated.

This ceiling may be applied using relationships regulating the rate at which fuel is delivered to each engine by the FADEC regulator member, or by putting a ceiling on the positions of the fuel metering devices.

Furthermore, in a manual first variant, a pilot activates the assisted piloting mode by manually requesting the assisted piloting mode for some minimum duration. By way of example, the control member activates assisted piloting mode if the pilot presses on a button for a duration of fifteen seconds.

This imposed minimum duration serves to ensure that assisted piloting mode is not engaged by mistake.

In an automatic second variant, a control member monitors the operation of the first limit indicator, and assisted piloting mode is activated automatically when a breakdown of the first limit indicator is detected.

As an option, the pilot of the aircraft is informed when assisted piloting mode is activated, e.g. by switching on an indicator light.

Furthermore, when the aircraft is a rotorcraft provided with at least one lift rotor driven at a speed of rotation, the assisted piloting mode may be deactivated when the speed of rotation drops below a predetermined limit speed.

If maneuvers performed by the pilot give rise to a dangerous reduction in the speed of rotation of the lift rotor, i.e. if its speed drops below a limit speed as predetermined by the manufacturer in the usual way, then, in order to avoid an accident, the pilot is allowed to request emergency performance from the engines, going beyond the imposed limits and thus beyond the predetermined thresholds.

Rather than preserving the engines, maximum authority is given to the pilot in order to save the rotorcraft.

Similarly, when the aircraft is a rotorcraft provided with at least one lift rotor driven at a speed of rotation, the assisted piloting mode may be deactivated when the lift rotor is subjected to deceleration greater than a predetermined limit deceleration.

If the speed of rotation drops off too quickly, there is no point in waiting for the speed of rotation to drop below a predetermined limit speed before giving full authority to the pilot.

For example, if assisted piloting mode is activated, the pilot of a helicopter cannot pull on the collective pitch lever beyond a certain position. The lever is then in abutment because of the limit imposed by the control member. On the contrary, when assisted piloting mode is deactivated, as a function of the speed of rotation of the lift rotor or as a function of the deceleration of the lift rotor, the collective pitch lever is released and full authority is returned to the pilot.

The present invention also provides an assisted piloting device for a rotorcraft, the device being suitable for implementing the method described above, said device including at least one first limit indicator, and at least one regulator member of at least first and second engines, e.g. a FADEC type regulator member.

The assisted piloting device is remarkable in that it comprises at least one control member suitable for maintaining a plurality of monitoring parameters of said engines below predetermined thresholds, optionally by putting a ceiling on each monitoring parameter at a predetermined threshold that corresponds to a limit set by the manufacturer.

The device may additionally include one or more of the following characteristics.

Thus, the rotorcraft includes control means for commanding emergency conditions when an engine breaks down, and when the engines are operating normally, the control means serve to activate the assisted piloting mode during which at least one control member maintains a plurality of monitoring parameters of the engines below predetermined thresholds.

The control member is in communication with the regulator member, thereby enabling it to determine whether the engines are operating properly. Under such circumstances, when the pilot uses the control means, the control member deduces therefrom that the pilot does not require emergency ratings to be implemented, but rather requires a ceiling to be put on the monitoring parameters of the engines.

The control member then puts a ceiling, e.g. on the rate at which fuel is fed to the engines.

Likewise, the rotorcraft includes first control means for commanding a first emergency rating and second control means for commanding a second emergency rating when an engine has broken down, and while the engines are operating normally, the first control means serve to activate an assisted piloting mode in which at least one control member maintains a plurality of monitoring parameters of the engines below predetermined first thresholds for a first normal operation rating, and the second control means enable an assisted piloting mode to be activated during which at least one control member maintains a plurality of monitoring parameters of the engines below second predetermined thresholds for a second normal operation rating.

In an embodiment, the control member is incorporated in the regulator member. For example, the control member is represented by an optionally dedicated microprocessor of a FADEC regulator member.

This solution is very practical since it can be implemented on existing aircraft without much modification.

In another embodiment, the control member is incorporated in the first limit indicator.

BRIEF DESCRIPTION OF THE DRAWINGS

The invention and its advantages appear in greater detail from the following description of embodiments given by way of illustration and with reference to the accompanying figures, in which.

DETAILED DESCRIPTION OF THE PREFERRED EMBODIMENT

Elements that are present in more than one of the figures are given the same references in each of them.

Figure 1:
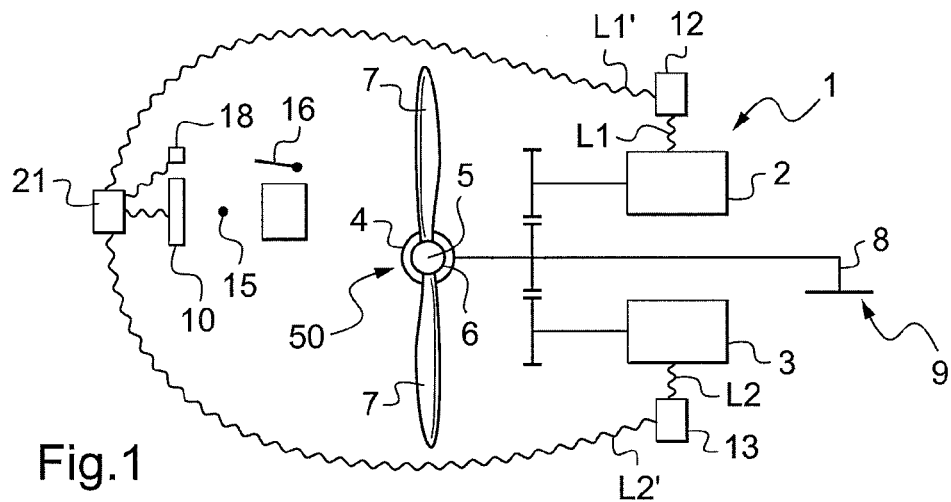
FIG. 1 shows an automatic variant of the invention.

FIG. 1 is a diagram explaining an automatic variant of the invention.

FIG. 1 shows an aircraft, of the helicopter type, provided with a power plant having first and second engines 2, 3, in particular free-turbine turbine engines.

Conventionally, the first and second engines are mechanically connected to a main power-transmission gearbox 4 suitable for rotating a lift and propulsion rotor 50 via a rotor mast 5. The lift rotor 50 is then fitted with a hub 6 that is secured to the rotor mast 5 and to a plurality of blades 7.

In addition, the first and second engines 2, 3 are suitable for driving a tail rotor 9 via a secondary power gearbox 8, conventionally referred to as a tail gearbox.

The first and second fuel metering devices of the first and second engines 2 and 3 are controlled respectively by first and second regulator members 12, 13 referred to as FADECs by the person skilled in the art. The first and second regulator members 12, 13 have respective first and second piloting members, e.g. microprocessors, that determine the positions of first and second fuel metering devices by using regulation loops. These regulation loops seek to maintain the speed of rotation NF of the free turbine of each engine within a predetermined range, and thus proportional to the speed of rotation NR of the lift rotor.

Consequently, the first and second regulator members 12, 13 are connected to the first and second engines 2, 3 via links L1, L2 for controlling the positions of the first and second fuel metering devices and for receiving information relating to monitoring parameters of the first and second engines 2, 3.

In order to pilot a helicopter, the pilot has a cyclic stick 15 for piloting maneuvers in pitching and in roll, by enabling the pitch of the blades 7 of the lift rotor 50 to be modified cyclically, with pedals (not shown) for controlling yaw maneuvers of the helicopter by acting on the tail rotor 9, and with a collective pitch lever 16 for controlling the lift provided by the lift rotor 50 by collectively modifying the pitch of the blades 7 of the lift rotor 50 so as to position the helicopter at a given altitude.

Furthermore, the pilot has a plurality of indicators, and in particular a first limit indicator 10 that displays that one of the monitoring parameters of the engines 2 and 3 that is the closest to its limit, referred to as the limiting parameter. Said limits are predetermined by the manufacturer and they vary from one monitoring parameter to another and from one engine rating to another.

On a twin-engined helicopter fitted with first and second turbine engines, there are six main monitoring parameters:

first and second gas generator speeds Ng for the first and second engines 2, 3, respectively;

first and second engine torques Tq for the first and second engines 2, 3; and first and second temperatures T4 at which gas is ejected at the inlet of the free turbine in each of the first and second engines 2, 3.

Under such circumstances, and independently of the implementation variant if the first limit indicator 10 breaks down, i.e. if said first limit indicator 10 is no longer capable of displaying the limiting parameter, an assisted piloting mode is activated in order to maintain each monitoring parameter below a predetermined threshold.

Under such circumstances, on a helicopter, the following ceilings are applied according to the invention:

the first and second gas generator speeds Ng are limited respectively to first and second threshold gas generator speeds Ng', Ng";

the first and second engine torques Tq are limited respectively to first and second threshold engine torques Tq', Tq"; and the first and second ejection temperatures are limited respectively to first and second threshold ejection temperatures T4' and T4".

These predetermined thresholds Ng', Ng", Tq', Tq', T4', and T4" are additionally values that vary as a function of the engine rating in use.

Consequently, in this degraded flight mode, the pilot does not need to worry about the engines and can devote attention to other work, for example looking for somewhere to land the aircraft.

In the variant of FIG. 1, assisted piloting mode is activated automatically.

The piloting assistance device of the invention includes the first limit indicator 10, the first and second regulator members 12, 13 for the first and second engines 2, 3, and a control member 21 connected firstly to the first and second regulator members 12, 13 by links L1', L2', and secondly to the first limit indicator 10.

The control member 21 then monitors proper operation of the first limit indicator 10 via conventional test procedures.

It should be observed that a central panel display system (CPDS) is known that is suitable for testing a first limit indicator of the VEMD type. For example, the CPDS member verifies that the first limit indicator is receiving all of the information it needs to enable it to determine the limiting parameter.

Under such circumstances, if the control member 21 observes a malfunction of the first limit indicator, e.g. because it is not receiving information enabling it to determine the limiting parameter, then the control member 21 activates the assisted piloting mode.

The control member 21 then orders the first and second regulator members 12, 13 to put ceilings on the monitoring parameters of the first and second engines 2, 3 at the predetermined thresholds, by taking said thresholds into consideration in the regulation loops or by putting ceilings on the positions of the first and second fuel metering devices.

Unlike the usual practice implemented on multi-engined aircraft, and in particular on twin-engined helicopters, the performance of the engine is voluntarily limited to a ceiling even though the engines are operating correctly, thereby lightening the work load of the pilot when flying in a degraded mode.

Since assisted piloting mode is activated automatically, the control member 21 causes an indicator lamp 18 to be switched on in order to warn the pilot.

Furthermore, FIG. 1 shows a single control member 21 distinct from the first limit indicator 10. Nevertheless, it is possible to incorporate the control member 21 in the first limit indicator 10, the control member 21 possibly comprising a microprocessor dedicated to activating the assisted piloting mode or also participating in associated operations.

It is also possible to implement a plurality of control members, e.g. one control member per regulator member 12, 13. The following non-limiting arrangements may be envisaged:

one control member monitoring the first limit indicator and informing the other control member when assisted pilot mode is to be activated;

both control members together monitoring the first limit indicator.

Furthermore, it is possible to incorporate each control member in the associated regulator member, each control member optionally comprising a microprocessor dedicated to activating assisted pilot mode or also contributing to associated operations.

Figure 2:
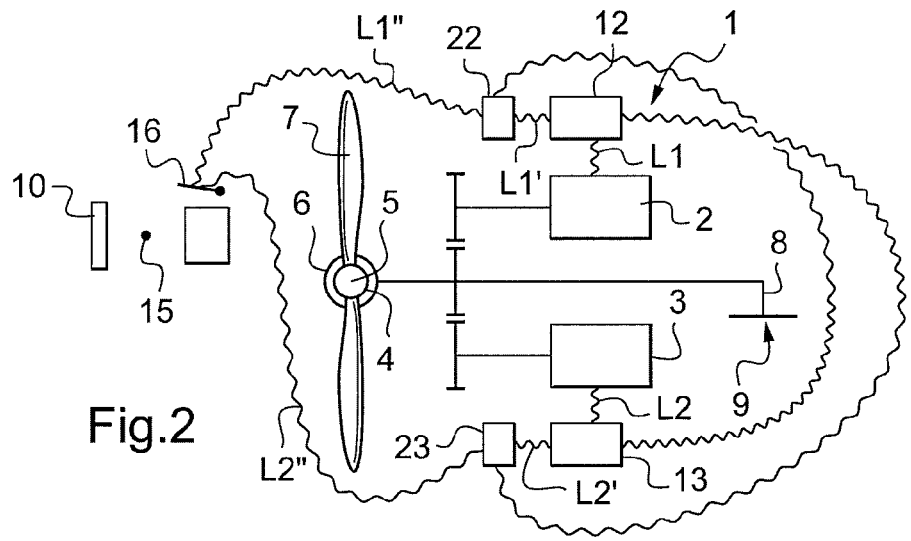
FIG. 2 shows a manual variant of the invention.

FIG. 2 shows a diagram for explaining a manual variant of the invention. In this variant, assisted piloting mode is not activated automatically without the pilot's knowledge, but manually and deliberately by the pilot.

Under such circumstances, FIG. 2 shows a piloting assistance device having first and second control members 22 and 23 connected by respective links L1', L2' to the first and second regulator members 12, 13. It should be observed that each control member may naturally be incorporated in the associated regulator member, each control member optionally comprising a microprocessor dedicated to activating assisted piloting mode or also contributing to associated operations.

The first and second control members 22, 23 are connected to at least one control means, such as a button located specifically on the collective pitch lever 16.

If the pilot observes a malfunction of the first limit indicator 10, then the manual control means are used to cause each control member 22, 23 to activate assisted piloting mode. As a safety measure, activation of assisted piloting mode advantageously becomes effective only if the pilot acts on the control means for some minimum duration.

Thus, if the pilot should press on a button of the control means for a duration that is shorter than the predetermined minimum duration, then the control member does not activate assisted piloting mode.

In addition, the first and second control members 22, 23 receive the command coming from the control means. The first and second control members 22, 23 then interrogate the first and second regulator members 12, 13 in order to determine whether the first and second engines 2, 3 are operating.

If not, the first and second control members 22, 23 deduce that the control means are requesting that emergency conditions be established.

In contrast, if the first and second engines 2, 3 are operating correctly, then the first and second control members 22, 23 deduce that the assisted piloting mode needs to be activated in order to put a ceiling on the monitoring parameters at the predetermined thresholds corresponding to the current rating of the engines.

Figure 3:
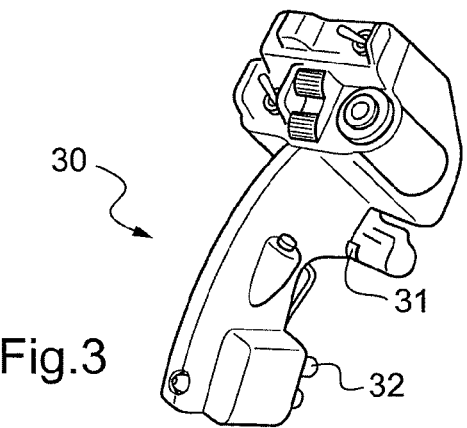
FIG. 3 shows a control stick provided with control means enabling the assisted piloting mode to be activated.

With reference to FIG. 3, the piloting assistance device has first and second control means 31, 32 arranged on a collective pitch lever 30.

Advantageously, for an aircraft constituted by a twin-engined helicopter, when one engine breaks down the first emergency rating OEI30" is automatically engaged. The first control means 31 then enable this first emergency rating OEI30" to be disengaged.

Furthermore, the second control means 32 enable the second emergency rating OEI2' to be engaged. Consequently, when one engine of a twin-engined helicopter breaks down, the first and second control means conventionally cause the first and second emergency ratings OEI30" and OEI2' to be engaged.

However, if the control members 22, 23 activate assisted piloting mode, then these control members consider that a command given by the first control means 31 means that it is appropriate to put a ceiling on the monitoring parameters at their predetermined thresholds for a first normal operation rating i.e. the maximum continuous power (MCP) rating. Similarly, a command given by the second control means 32 means that it is appropriate to put a ceiling on the monitoring parameters at their predetermined thresholds for a second normal operation rating, namely take-off power (TOP) rating.

Although FIG. 2 shows two control members 22, 23, it will readily be understood that it is possible to use a single control member connected to the first and second regulator members, possibly incorporated in the first limit indicator.

Additionally, independently of the variant that is implemented, with the lift rotor 50 being driven at a speed of rotation, assisted piloting mode is deactivated when its speed of rotation drops below a predetermined limit speed.

Thus, the control member(s) no longer require(s) the regulator members to put a ceiling on the monitoring parameters in order to enable the pilot to obtain sufficient power to extricate the aircraft from a difficult situation.

Similarly, assisted piloting mode is deactivated when the lift rotor 50 is subjected to deceleration that is greater than a predetermined deceleration limit.

Naturally, the present invention may be subjected to numerous variations as to its implementation. Although several embodiments are described, it will readily be understood that it is not conceivable to identify exhaustively all possible embodiments. It is naturally possible to envisage replacing any of the means described by equivalent means without going beyond the ambit of the present invention.

What is claimed is:

1. A method of assisting piloting of an aircraft having at least two engines, each engine having a plurality of parameters (Ng, T4, Tq) and each parameter having a limit, the method comprising:
    displaying, from a first limit indicator for a pilot to view, information relating to a limiting parameter of said engines, the limiting parameter being the parameter amongst the parameters (Ng, T4, Tq) of the engines that is the closest to its limit; and
    activating an assisted piloting mode in which the engines are automatically controlled without pilot intervention to keep each parameter (Ng, T4, Tq) of the engines below a respective predetermined threshold whenever said first limit indicator is no longer in a position to display said information.

2. The method according to claim 1, wherein said engines are turbine engines, each having a free turbine and a gas generator, and said monitoring parameters (Ng, T4, Tq) comprise the speed (Ng) of the gas generator of each engine, the engine torque (Tq) of each engine, and the gas ejection temperature (T4) at the inlet to the free turbine of each engine.

3. The method according to claim 1, wherein said engines are capable of operating at a plurality of ratings, and said predetermined thresholds is being modified as a function of current ratings of the engines.

4. The method according to claim 1, wherein each parameter (Ng, T4, Tq) is maintained below the respective predetermined threshold by putting ceilings on said parameters (Ng, T4, Tq).

5. The method according to claim 1, wherein each parameter (Ng, T4, Tq) is maintained below the respective predetermined threshold by putting a ceiling on the rate at which fuel is fed to said engines.

6. The method according to claim 1, wherein a pilot activates said assisted piloting mode by manually requesting said assisted piloting mode for some minimum duration.

7. The method according to claim 1, wherein the operation of said first limit indicator is monitored, and said assisted piloting mode is activated automatically when a breakdown of said first limit indicator is detected.

8. The method according to claim 1, wherein the pilot of said aircraft is informed when said assisted piloting mode is activated.

9. The method according to claim 1, wherein said aircraft is a rotorcraft provided with at least one lift rotor driven at a speed of rotation, and said assisted piloting mode is deactivated when said speed of rotation drops below a predetermined limit speed.

10. The method according to claim 1, wherein said aircraft is a rotorcraft provided with at least one lift rotor driven at a speed of rotation, and said assisted piloting mode is deactivated when said lift rotor is subjected to deceleration greater than a predetermined limit deceleration.

11. An assisted piloting device for a rotorcraft having at least two engines, each engine having a plurality of parameters (Ng, T4, Tq) and each parameter having a limit, said device comprising:
    a first limit indicator configured to display information relating to a limiting parameter of said engines, the limiting parameter being the parameter amongst the parameters (Ng, T4, Tq) of the engines that is the closest to its limit; and
    a control member suitable for maintaining the parameters (Ng, T4, Tq) of said engines below predetermined thresholds when an assisted piloting mode is activated upon said first limit indicator being no longer in a position to display said information.

12. The assisted piloting device according to claim 11, wherein said rotorcraft includes control means for commanding emergency conditions when an engine breaks down, and when the engines are operating normally, said control means serve to activate said assisted piloting mode during which the control member maintains the parameters (Ng, T4, Tq) of said engines below predetermined thresholds.

13. The assisted piloting device according to claim 11, wherein said rotorcraft includes first control means for commanding a first emergency rating (OEI30") and second control means for commanding a second emergency rating (OEI2') when an engine has broken down, and while the engines are operating normally, said first control means serve to activate an assisted piloting mode in which the control member maintains the parameters (Ng, T4, Tq) of said engines below predetermined first predetermined thresholds for a first normal operation rating, and said second control means enable an assisted piloting mode to be activated during which the control member maintains the parameters (Ng, T4, Tq) of said engines below second predetermined thresholds for a second normal operation rating.

14. The assisted piloting device according to claim 11, wherein said control member is incorporated in a regulator member for the engines.

15. The assisted piloting device according to claim 11, wherein said control member is incorporated in said first limit indicator.

16. A system for assisting piloting of an aircraft having an engine, the engine having a plurality of parameters and each parameter having a limit, the system comprising:
a first limit indicator configured to display information relating to a limiting parameter of the engine, the limiting parameter being the parameter amongst the parameters of the engine that is the closest to its limit; and
a controller configured to activate an assisted piloting mode in which the engine is automatically controlled to maintain the parameters of the engine below respective predetermined thresholds, which are respectively below the limits of the parameters, whenever the first limit indicator is unable to display the information relating to the limiting parameter of the engine.

17. The system of claim 16 wherein the aircraft has a plurality of engines, each engine having a plurality of parameters and each parameter having a limit, wherein:
the limiting parameter is the parameter amongst the parameters of the engines that is the closet to its limit and the controller is further configured to automatically control the engines to maintain the parameters of the engines below respective predetermined thresholds, which are respectively below the limits of the parameters of the engines, whenever the first limit indicator is unable to display the information relating to the limiting parameter of the engines.

\* \* \* \* \*